US008145507B2

(12) United States Patent
Zizzamia et al.

(10) Patent No.: US 8,145,507 B2
(45) Date of Patent: Mar. 27, 2012

(54) COMMERCIAL INSURANCE SCORING SYSTEM AND METHOD

(75) Inventors: Frank M. Zizzamia, Canton, CT (US); Cheng-Sheng Peter Wu, Arcadia, CA (US); Dominic A. Tocci, Oak Park, IL (US); Matthew R. Carrier, Naperville, IL (US); John Lucker, Simsbury, CT (US)

(73) Assignee: Deloitte Development LLC, Hermitage, TN (US)

( * ) Notice: Subject to any disclaimer, the term of this patent is extended or adjusted under 35 U.S.C. 154(b) by 1560 days.

(21) Appl. No.: 10/054,702

(22) Filed: Oct. 23, 2001

(65) Prior Publication Data
US 2002/0161609 A1 Oct. 31, 2002

Related U.S. Application Data

(60) Provisional application No. 60/242,633, filed on Oct. 23, 2000.

(51) Int. Cl.
*G06Q 40/00* (2006.01)
(52) U.S. Cl. .............................. 705/4; 705/38; 705/7.28
(58) Field of Classification Search .................... 705/4
See application file for complete search history.

(56) References Cited

U.S. PATENT DOCUMENTS

| | | | |
|---|---|---|---|
| 4,766,539 A * | 8/1988 | Fox ........................ | 705/4 |
| 4,831,526 A * | 5/1989 | Luchs et al. ............ | 705/4 |
| 4,837,693 A | 6/1989 | Schotz | |
| 4,975,840 A * | 12/1990 | DeTore et al. ........... | 705/4 |
| 5,191,522 A * | 3/1993 | Bosco et al. ............. | 705/4 |
| 5,613,072 A | 3/1997 | Hammond et al. | |
| 5,692,107 A * | 11/1997 | Simoudis et al. ........ | 706/12 |
| 5,752,236 A * | 5/1998 | Sexton et al. ............ | 705/4 |
| 5,774,883 A | 6/1998 | Andersen et al. | |
| 5,809,478 A * | 9/1998 | Greco et al. ............. | 705/4 |
| 5,819,266 A | 10/1998 | Agrawal et al. | |
| 5,839,113 A * | 11/1998 | Federau et al. ......... | 705/4 |
| 5,884,275 A | 3/1999 | Peterson et al. | |
| 5,893,072 A * | 4/1999 | Zizzamia ................. | 705/4 |
| 5,937,387 A | 8/1999 | Summerell et al. | |
| 5,956,691 A | 9/1999 | Powers | |
| 5,970,464 A * | 10/1999 | Apte et al. ............... | 705/4 |
| 6,003,020 A | 12/1999 | Hazlehurst et al. | |
| 6,009,415 A | 12/1999 | Shurling et al. | |
| 6,014,632 A | 1/2000 | Gamble et al. | |
| 6,038,554 A | 3/2000 | Vig | |
| 6,076,072 A | 6/2000 | Libman | |
| 6,128,599 A | 10/2000 | Walker et al. | |

(Continued)

OTHER PUBLICATIONS

Dionne, Georges. "Handbook of Insurance" Copyright 2000. Kluwer Academic Publishers Group.*

(Continued)

*Primary Examiner* — Alexander Kalinowski
*Assistant Examiner* — Abhishek Vyas
(74) *Attorney, Agent, or Firm* — Kramer Levin & Naftails & Frankel LLP

(57) ABSTRACT

A quantitative system and method that employs data sources external to an insurance company to generate a statistical model that may be used to more accurately and consistently predict commercial insurance profitability (the "predictive statistical model"). The system and method are able to predict individual commercial insurance policyholder profitability on a prospective basis regardless of the internal data and business practices of a particular insurance company.

26 Claims, 5 Drawing Sheets

U.S. PATENT DOCUMENTS

| | | | |
|---|---|---|---|
| 6,148,297 | A | 11/2000 | Swor et al. |
| 6,173,280 | B1 | 1/2001 | Ramkumar et al. |
| 6,182,048 | B1 | 1/2001 | Osborn et al. |
| 6,236,975 | B1 | 5/2001 | Boe et al. |
| 6,453,979 | B1 * | 9/2002 | Soderstrom et al. ......... 164/133 |
| 6,456,979 | B1 * | 9/2002 | Flagg ................................ 705/4 |
| 6,473,084 | B1 * | 10/2002 | Phillips et al. ................ 345/440 |
| 6,725,210 | B1 * | 4/2004 | Key et al. ........................ 706/45 |
| 7,072,841 | B1 * | 7/2006 | Pednault ........................... 705/4 |
| 7,392,201 | B1 * | 6/2008 | Binns et al. ...................... 705/4 |
| 7,698,213 | B2 * | 4/2010 | Lancaster ....................... 705/38 |
| 2002/0116231 | A1 | 8/2002 | Hele et al. |
| 2002/0133441 | A1 | 9/2002 | Tanaka |
| 2002/0188480 | A1 | 12/2002 | Liebeskind et al. |
| 2003/0101080 | A1 * | 5/2003 | Zizzamia et al. ................. 705/4 |
| 2006/0136273 | A1 * | 6/2006 | Zizzamia et al. ................. 705/4 |

OTHER PUBLICATIONS

Clapp, John M., Fields, Joseph A., Ghosh, Chinmoy, Ghosh. "An Examination of Profitability in Spatial Markets: The Case of Life Insurance Agency Locations" Sep. 1990. Journal of Risk and Insurance. vol. 57, Iss. 3.*

Tosetti, A., Behar, T., Fromenteau, M., & Ménart, S.. (2001). Insurance: Accounting, Regulation, Actuarial Science. Geneva Papers on Risk & Insurance, 26(2), 232-251. Retrieved Nov. 9, 2011, from ABI/INFORM Global. (Document ID: 2504664471).*

Jaffe, Jay M.. (Feb. 1992). Small Changes Mean Big Bucks for Insurance Marketers. Direct Marketing, 54(10), 39. Retrieved Nov. 9, 2011, from ABI/INFORM Global. (Document ID: 337733).*

K A Smith, R J Willis, & M Brooks. (2000). An analysis of customer retention and insurance claim patterns using data mining: A case study. The Journal of the Operational Research Society, 51(5), 532-541. Retrieved Nov. 9, 2011, from ABI/INFORM Global. (Document ID: 54187900).*

Chidanand Apte, Edna Grossman, Edwin P D Pednault, Barry K Rosen, & et al. (1999). Probabilistic estimation-based data mining for discovering insurance risks. IEEE Intelligent Systems & Their Applications, 14(6), 49-58. Retrieved Nov. 9, 2011, from ProQuest Computing. (Document ID: 47306554).*

* cited by examiner

COMMERCIAL INSURANCE SCORING SYSTEM AND METHOD

RELATED APPLICATION DATA

This Application claims priority from previously filed U.S. Provisional Patent Application No. 60/242,633 filed on Oct. 23, 2000, the disclosure of which is incorporated by reference in its entirety.

BACKGROUND OF THE INVENTION

The present invention is directed generally to a system and method for predicting the profitability of insurance coverage and, more specifically, to a system and method for calculating or deriving a score that is predictive of the future profitability of commercial insurance to be issued to a potential, or reissued to an active, policyholder. The future profitability of commercial insurance can be defined as an assessment, on a prospective basis, of whether a policyholder is going to be charged too much, or too little, as is generally determinable by conventional insurance company pricing methodologies using standard and traditional methods to establish premiums, in relation to that particular policyholder's expected losses.

Commercial insurance provides coverage for many different types of exposures. These include several major lines of coverage, e.g., property, general liability, automobile, and workers compensation. There are many other types of specialty coverages and many more types of subcoverages within the major lines of coverage.

Ideally, an insurance company would price a coverage based on a policyholder's future losses, i.e., the price should be a function of the loss potential which can never be completely known in advance, hence the introduction of risk. The more accurate assessment of that risk, then the more certainty of profitability of the individual insurance policy. The premiums to be paid by the policyholder for the coverage should reflect this risk. That is, higher premiums should be charged for high-risk policyholders while lower premiums should be charged for low-risk policyholders.

The problem of how to adequately price a coverage is challenging, often requiring the application of complex and highly technical actuarial transformations. The technical difficulties with pricing coverages are compounded by real world marketplace pressures such as the need to maintain an "ease-of-business-use" process with policyholders and agents, and the underpricing of coverages by competitors attempting to buy market share.

In the insurance industry, there are generally two approaches for determining the appropriate premium, or pricing, in relation to the insurance risk for a specific major coverage. The first approach is to price the underlying exposure being insured by the particular coverage, e.g., the business property to be insured for property related losses. The second and less practiced approach is to price the coverage based on certain characteristics or practices of the owner of the business property to be insured.

Under the first approach, pricing is based on tangible factors such as the square footage of the property, location of the property, number of vehicles and number of employees. These tangible factors are quantitative and, for the most part, easily capable of measurement. Under the second and less practiced approach, while the exposure characteristics of the first approach may in fact set a base premium level, the final determination of the price of the coverage is further determined as related to certain characteristics of the business owner and the business practices of the business itself. For example, the premium for a particular coverage may depend on how conservative and careful the business owner is in conducting his or her business operation. That is, a more profitable insurance policy is more likely to result from a conservative and careful business owner, which characteristics should be reflected in the determination of each such policyholder's final price.

Despite the availability of alternative pricing methodologies, the insurance regulatory system is based on the first approach, i.e., pricing the exposure, while relegating the business practices and business owner characteristic aspect of pricing to underwriting judgment and expertise. Thus, in the current marketplace little practical emphasis is placed on the business practices and business owner characteristic aspect of pricing coverages.

In addition, the insurance industry has not effectively included the use of external data sources in the estimation of the profitability of a commercial insurance policy, or in other words, the determination of an appropriate premium for a particular commercial insurance policy. External data sources offer one of the best opportunities to obtain the characteristics of a business and or the practices of an owner of the business property to be insured, which is essential for practicing the second approach to pricing as described above. While commercial insurance companies have occasionally looked to non-traditional factors to supplement their conventional pricing methods, such use has been at best haphazard, inconsistent, and usually relegated to a subjective perspective of an underwriter. In the commercial insurance industry, these practices have resulted in pricing methods that, although occasionally using non-traditional factors, are generally specific to the data and business practices of a particular insurance company.

Accordingly, a need exists for a system and method that performs a complete profitability evaluation that does not rely on conventional commercial insurance pricing methodologies. A still further need exists for such a system and method that utilizes external data sources to generate a generic statistical model that is predictive of future profitability of commercial insurance coverages, independent of a particular insurance company's internal data, business practices, and particular pricing methodology. A still further need exists for such a system and method that can be used to augment conventional commercial insurance pricing methodologies to quantitatively include through the use of external data sources business owners' characteristics and business practices, and other non-exposure-based characteristics.

In view of the foregoing, the present invention provides a quantitative system and method that employs data sources external to an insurance company to either independently or more accurately and consistently predict the future profitability of commercial insurance on a per policyholder basis. The present system and method predict profitability using a statistical model that is developed from external data sources independent of a particular insurance company's internal data, business practices, and particular pricing methodology.

SUMMARY OF THE INVENTION

The present invention is directed to the creation of a predictive statistical model that generates a score representative of the commercial insurance profitability of a new, or existing, policyholder, independent of the internal data, business practices or pricing methodology of the insurance company issuing the policy, including the steps of (i) gathering historical policyholder data from one of a number of sources, e.g., a representative group of insurance companies historical policyholder data, an insurance industry organization's aggregated policyholder data from member companies, public sources such as state insurance departments which may maintain historical data required by statutory reporting requirements, and the like, and then storing such historical policyholder data in a database; (ii) identifying external data sources having a plurality of external variables potentially predictive of profitability, each variable preferably having at least two values; (iii) normalizing the historical policyholder data using actuarial transformations to generate working data; (iv) calculating a loss ratio for each policyholder in the database using the working data; (v) using the working data to calculate a cumulative loss ratio for each potentially predictive external variable value; (vi) analyzing one or more external variables to identify significant statistical relationships between the one or more external variables and the cumulative loss ratio; (vii) identifying and choosing predictive external variables based on statistical significance and the determination of highly experienced actuaries and statisticians; (viii) utilizing the various predictive variables to develop an overall model or algorithm predictive of the commercial insurance profitability; and (ix) scoring new or existing policyholders using the predictive statistical model as developed herein.

In accordance with another aspect of the invention the external sources are selected from a group comprised of business level databases (e.g., Dun & Bradstreet and Experian), zip code level census data (as provided by the U.S. government or third party source), county level data such as weather, and business owner household level demographics data (e.g., Axciom and INFO-USA).

In accordance with yet another aspect of the invention, the database includes historical premium and loss data on a plurality of policyholders from one or more of the possible historical policyholder data sources.

Accordingly, it is an object of the present invention to provide a system and method that employs data sources external to an insurance company to develop a statistical model that is predictive of individual commercial insurance policyholder profitability, independent of the internal business practices or internal data of a particular commercial insurance provider. Other objects and advantages of the invention will in part be obvious and will in part be apparent from the specification.

The present invention accordingly comprises the various steps and the relation of one or more of such steps with respect to each of the others, and the product which embodies features of construction, combinations of elements, and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is made to the following description, taken in connection with the accompanying drawings, in which.

DETAILED DESCRIPTION OF THE PREFERRED EMBODIMENTS

The present invention is a quantitative system that employs data sources external to an insurance company to generate a statistical model that may be used to predict commercial insurance profitability (the "predictive statistical model"). The predictive statistical model may be based on multivariate methods or other comparable statistical algorithmic approaches. Subsequent descriptions herein will utilize a multivariate statistical approach as the basis for the description of the underlying methodology of developing the model and its associated structure.

Figure 1A:
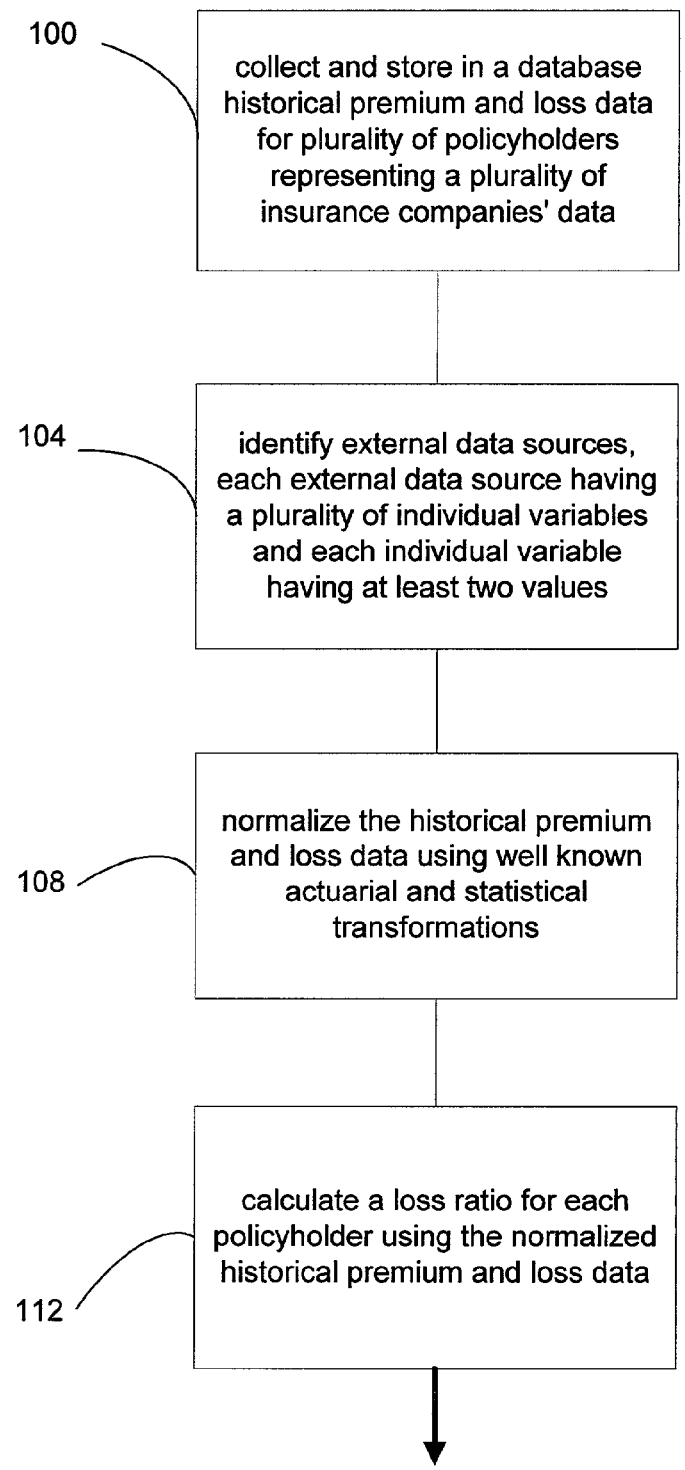
FIGS. 1A and 1B are flow diagrams depicting the steps carried out in actuarially transforming policyholder data and identifying predictive external variables preparatory to developing a statistical model that predicts individual commercial insurance profitability in accordance with a preferred embodiment of the present invention.
Figure 1B:
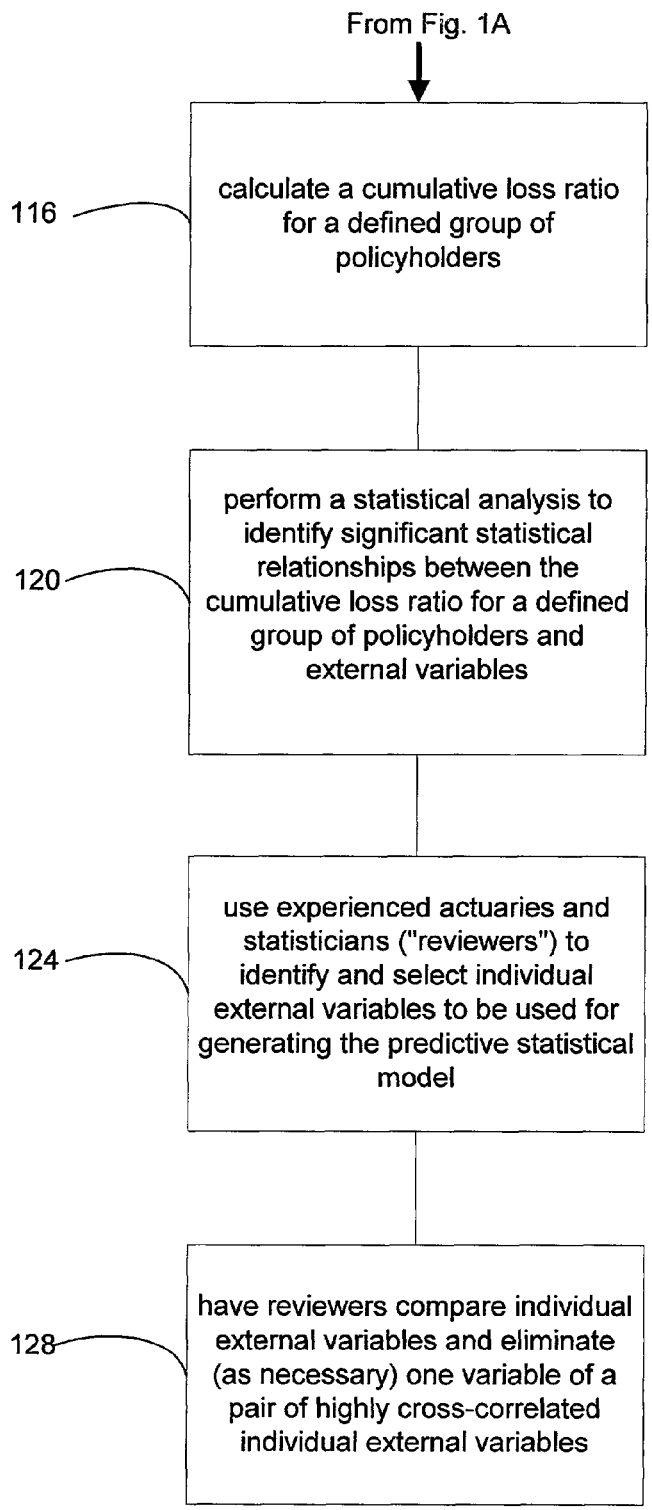

Reference is first made to FIGS. 1A and 1B which generally depict the steps in the process preparatory to developing the statistical predictive model based on historical policyholder data and associated external data. To begin the process, historical premium and loss data for a plurality of policyholders are collected from one or more of the historical policyholder data sources and stored in a database in step 100 as policyholder records. Next, in step 104, a number of external data sources having a plurality of variables, each variable having at least two values, are identified for use in generating the predictive statistical model.

Figure 3:
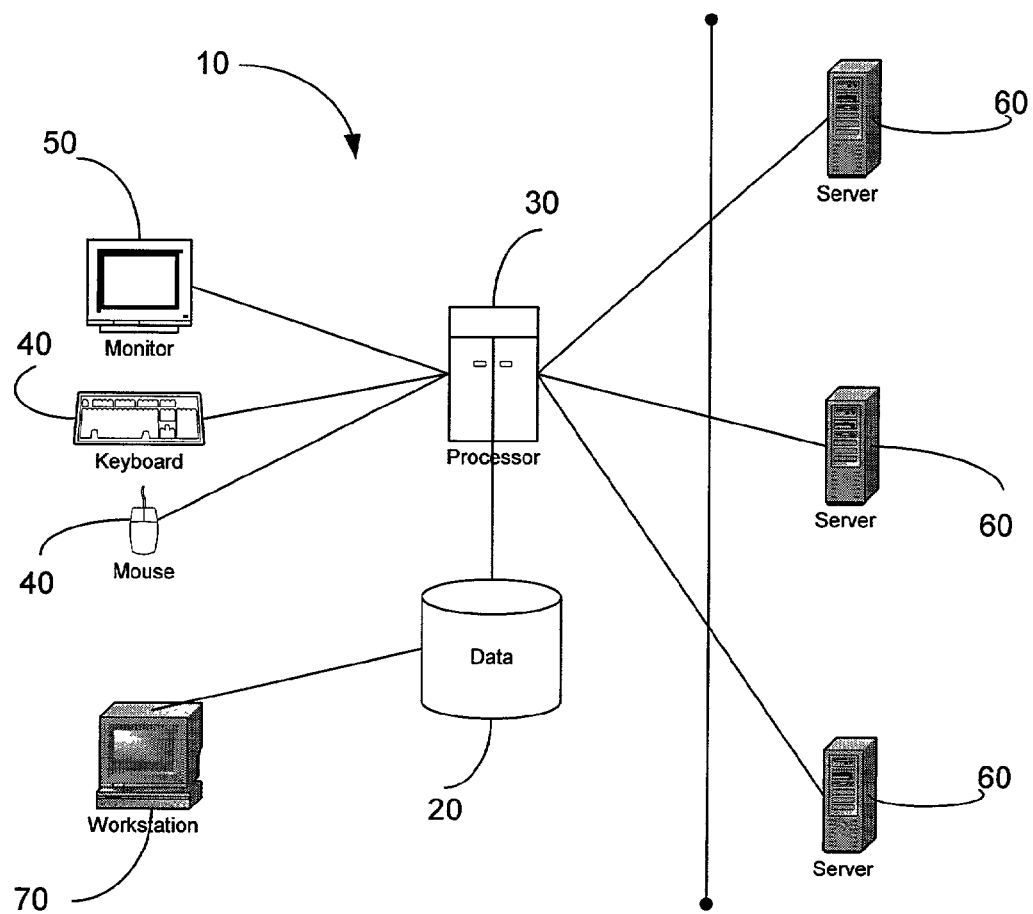
FIG. 3 is a block diagram of a system according to an exemplary embodiment of the present invention.

As shown in FIG. 3, the historical policyholder data may be stored on a relational database 20 (as are well known and provided by, for example, IBM, Microsoft Corporation, Oracle and the like) associated with a computer system 10 running the computational hardware and software applications necessary to generate the predictive statistical model. The computer system 10 should include a microprocessor 30, memory (not shown), storage medium (not shown), input devices (e.g., keyboard, mouse) 40, and a monitor 50. The system 10 may be operated using a conventional operating system and preferably includes a graphical user interface for navigating and controlling various computational aspects of the present invention. The system 10 may also be linked to one or more external data source servers 60 that feed the system 10 with the necessary external data for deriving the predictive statistical model. Alternatively, as shown in FIG. 3, a stand-alone workstation 70, including a processor, memory, input devices and storage medium may be used to access the database 20.

In step 108, the historical policyholder premium and loss data are normalized using actuarial transformations. This step may also include the creation of new variables which are combinations of or derived from external variables obtained from the external data sources. For example, the external data source of Dun & Bradstreet provides the external variable, annual sales; by extracting several historical years of annual sales for a policyholder, that policyholder's change in annual sales from year-to-year may be easily calculated and treated as a new or additional variable not otherwise available from the external data source.

The normalized data ("work data") including normalized premium data ("premium work data") and normalized loss data ("loss work data") are associated with the data sources to help identify external variables predictive of profitability from the external data sources. As an initial step in this process, a loss ratio is calculated from each policyholder's premium work data and loss work data, in step 112. The loss ratio is defined as the ratio of losses to premiums for a specific policy term, i.e., the premium and losses for a particular policy term, usually representing a time period of twelve months and specifically identified with a starting date and an expiration date.

Thereafter, in step 116 a cumulative loss ratio is calculated for a defined group of policyholders. A defined group of policyholders may be all policyholders covered by a major line of coverage. The cumulative loss ratio is defined as the ratio of the sum of the loss work data for a defined group to the sum of the premium work data for the same defined group. Once the cumulative loss ratio has been calculated for a defined group, a statistical analysis is performed in step 120 to identify any significant statistical relationships between the cumulative loss ratio for the defined group and one or more external variables taken from the external data sources (e.g., Dun & Bradstreet).

Additional statistical analysis is also performed in step 120 to identify any statistical relationships between one or more external variables taken from the external data sources that may be related to the cumulative loss ratio for the defined group as evidenced by their possible relationship to variables that are themselves known to be related to, and associated with, the cumulative loss ratio for the defined group, e.g., the loss frequency or the loss severity. As these other related measures of profitability are present in the policyholder historical data, such statistical relationships can be calculated.

With the statistical analysis completed for one or more external variables, the significance of the relationship between the one or more external variables and cumulative loss ratio for the defined group is determined by highly experienced actuaries and statisticians (the "reviewers") in step 124. This step of the process is highly empirical in nature. Based on the critical determinations of the reviewers, individual external variables will be selected for generating the predictive statistical model.

After the individual external variables have been selected by the reviewers as being significant, these variables are examined in step 128 for cross-correlations against one another. To the extent cross-correlation is present between, for example, a pair of external variables, the reviewer may elect to discard one external variable of the pair of external variables showing cross-correlation.

Figures 2A, 2B:
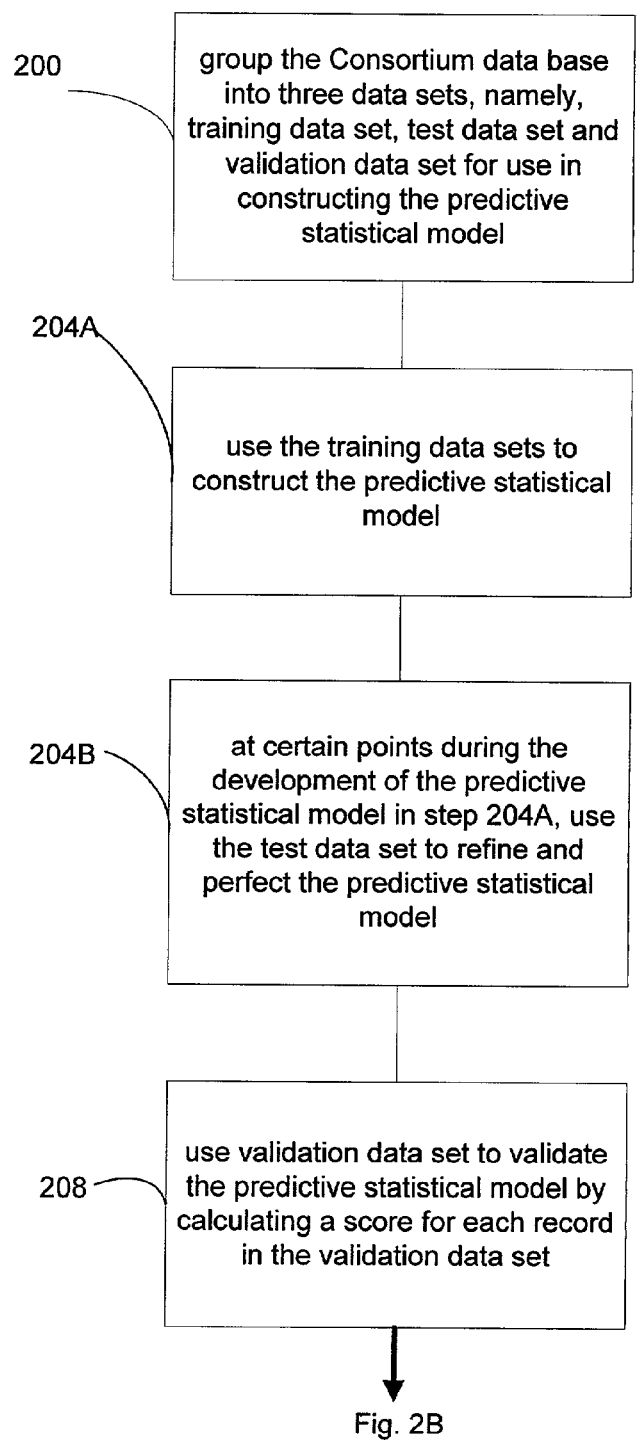
FIGS. 2A and 2B are flow diagrams depicting the steps carried out in developing the statistical model and calculating a score using the statistical model that predicts individual commercial insurance in accordance with a preferred embodiment of the present invention.
Figure 2B:
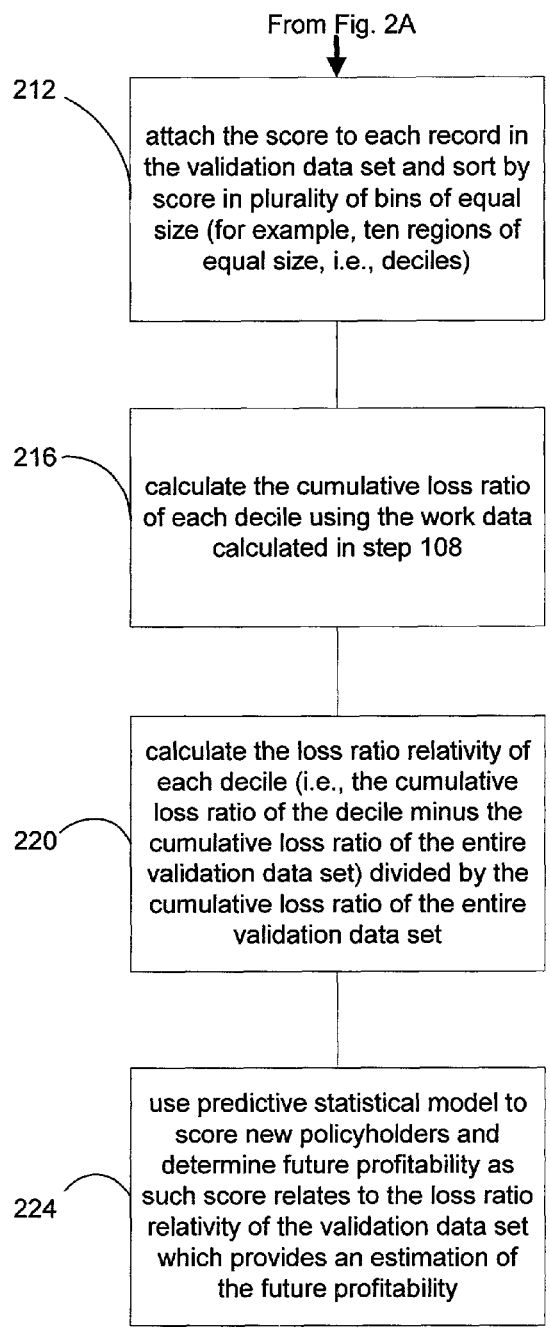

Referring now to FIGS. 2A and 2B, the steps in the process for generating the predictive statistical model based on historical and external data and score calculation are generally depicted. In step 200, the data is split into multiple separate subsets of data on a random, or otherwise statistically significant basis, that is actuarially determined. More specifically, the data is split into a training data set, test data set and validation data set. This is essentially the last step before developing the predictive statistical model. At this point the work data has been calculated and the external variables predictive of profitability have been initially defined.

As will be explained in detail, the task of developing the predictive statistical model is begun using the training data set in step 204A. As part of the same process, in step 204B, the test data set is used to evaluate the efficacy of the predictive statistical model being developed with the training data set. The results from the test data set may be used at various stages to modify the development of the predictive statistical model. Once the predictive statistical model is developed, the predictiveness of the model is tested on the validation data set in steps 208-220.

More specifically, the validation data set is scored in step 208 using the predictive statistical model developed in steps 204A and 204B. In step 212, the policies in the validation data set are sorted by the score assigned to each by the predictive statistical model and divided in groups of equal size, typically ten. Next, in step 216, the cumulative loss ratio of each group is calculated using the work data derived in step 108. In step 220, a loss ratio relativity for each group is calculated.

In calculating the score of a new or existing policyholder, the predictive statistical model developed in steps 204A and 204B and validated in step 208 is used. First, the data for the predictive variables that comprise the statistical model are gathered from the external data sources. Based on these values, the predictive statistical model generates a score. This score is then gauged against one of the loss ratio relativities calculated in step 220 in order make a commercial insurance profitability prediction, as shown in step 224.

The steps as shown in FIGS. 1A, 1B, 2A and 2B are now described in more detail. In the preferred embodiment of the present invention, actual historical premiums and loss data for a plurality of policyholders are derived or calculated from the historical policyholder data from the external data sources (the "Consortium") in step 100. Preferably, several years of policyholders' data are gathered and pooled together in a single database (the "Consortium database") as policyholder records. Other related information on each policyholder is also gathered and pooled into the Consortium database, e.g., the policyholder's business name, address including zip code, type of coverage, number of business properties, etc. This information is critical in associating a policyholder's data with the predictive variables obtained from the external data sources.

External data aggregation is a rapidly expanding field. Numerous vendors are constantly developing new external data bases. According to a preferred embodiment of the present invention, the external data sources include, but are not limited to the following described external data sources. Of significant importance is individual business level databases such as Dun & Bradstreet (D&B) and Experian data. Variables selected from the business level databases are matched to the data held in the Consortium database electronically based on the business name and address of the policyholder. However, more accurate keyed matches may be employed whenever an external data provider's unique data key is present in the data sources, e.g., a DUNS number is present in the Consortium database allowing the data to be matched to a specific record in the D&B database based on the D&B DUNS number.

Also included as an external data source is census data that is available from both U.S. Government agencies and third parties vendors, e.g., the EASI product. Such census data is matched to the Consortium database electronically based on the policyholder's business level zip code. County level data is also available and can include such information as historical weather patterns, hail falls, etc. In the preferred embodiment of the present invention, the individual business level zip codes are rolled up to a county level and the Consortium database is then matched to the county level data.

External data sources also include business owner household level demographics from data providers such as Axciom or INFO-USA. These data providers offer many characteristics of a business owner's household, e.g., income, home owned or rented, education level of the business owner, etc. The business owner household level data is based on the business owner's name, address, and when available, social security number. Other business owner level data sources are also included, when available. These include a business owner's individual credit report, driving record from MVR and automobile and homeowners loss information from CLUE reports, both of which are available from ChoicePoint and other similar data aggregators.

Thus in step 104, several major external data sources having multiple variables potentially predictive of commercial insurance profitability are identified. Variables are selected from each of the multiple external data sources and matched to the Consortium database on a policy-by-policy basis. The variables from the external data sources are available to be matched to Consortium data to identify a relationship between the variables (on a per value basis, assuming a variable has more than one value) and commercial insurance profitability, as evidenced by the cumulative loss ratio associated with each value of these in the Consortium database. As the statistical relationship between the variables and Consortium data is established, these variables will be considered for inclusion in the development of a model that is predictive of commercial insurance profitability.

There are major classes or types of variables from the external data sources for each policyholder in the Consortium data. These include geographic factors, business stability, policy characteristics, weather patterns, and business owner household information. In the table 1.0 below, examples of individual variables for each of these classes of variables are listed as might be employed for a commercial automobile profitability predictive model:

TABLE 1.0

| Geographic Factors |
| --- |
| Population percent employed in transportation |
| Crime rate |
| Business Stability |
| Import/export |
| Bankruptcy |
| Manufacturing company |
| Sales |
| Number of employees |
| Payment experience |
| Weather Patterns |
| Extreme heat |
| Average hail |
| Business Owner Household |
| Education |
| Number of children |
| Household income |

The matching process for the external data is completely computerized. Each individual external data base has a unique key on each of the records in the particular database. This unique key must also exist on each of the records in the Consortium database. For external business level data, e.g., Dun & Bradstreet, the unique key is the business name and address or in some instances the Federal Employer Identification Number (FEIN). For the census data, the unique key is either the county code or the zip code. For business owner household level demographics, the unique key is either the business owner's name and personal household address, or the business owner's social security number.

The external data is electronically secured and loaded onto the computer system where the Consortium data can be accessed. One or more software applications then match the appropriate external data records to the appropriate Consortium database records. The resulting match produces expanded Consortium database records with not only historical policyholder data but matched external data as well. In some cases, the external data vendor may provide the matching function and return completely matched and updated records back to the Consortium database.

As further described, the Consortium data is matched to the external data sources. The actual keys for each class of external data is described in table 2.0:

TABLE 2.0

| | |
| --- | --- |
| Geographic Factors | zip code |
| Business Stability | business name and address |
| Weather Patterns | county code |
| Business Owner Household | ssn or business owner name and address |

Next, in step 108, necessary and appropriate actuarial modifications to the data held in the Consortium database are completed. Actuarial transformations are required to make the data more useful in the development of the predictive statistical model since much of the data within the Consortium database cannot be used in its raw form. This is particularly true of the premium and loss data. These actuarial transformations include, but are not limited to, premium manualization to achieve a common basis of premium comparison, loss trending, loss capping, and other actuarial techniques that may be relied on to accurately reflect the true loss potential of each individual policyholder.

Premium manualization is an actuarial technique that transforms diversely calculated individual policyholder premiums to a common basis that is based upon a standard premium, sometimes referred to as the manual premium. A manual premium is a premium that can be calculated by following the formulae in insurance company manuals or the formulae in insurance industry organization's published manuals. This is necessary since the actual premium that a policyholder is charged is not entirely a consistent or a quantitative process. More particularly, within any individual insurance company, commercial insurance premiums for a particular policyholder typically can be written by several "writing" companies, each of which may charge a different base premium. Different underwriters will often select different writing companies even for the same policyholder. Additionally, an underwriter may apply credits or debits for individual policies further affecting the base premium. Thus, there are significant qualitative judgments or subjective elements in the process that complicate the determination of a manual premium.

The premium manualization process removes these, and other, subjective elements from the determination of the premium for every policy in the Consortium database. As a result, a common base premium may be determined. Such a common basis is required to develop the profitability indications from the data that are necessary to build the predictive statistical model. It may also remove the effect of rate changes throughout the data time periods, as well as the pricing differences between different insurance companies whose data comprise the Consortium database.

The Consortium database loss data must also be actuarially modified or transformed according to a preferred embodiment of the present invention to produce accurate profitability predictions. More specifically, some commercial insurance coverages have "long tail losses." Long tail losses are losses that are usually not paid during the policy term, but rather are paid a significant amount of time after the end of the policy period. Different commercial coverages have significantly different long tail loss patterns, and these differences must be compensated for through appropriate actuarial modifications. A time limit for such loss development must be selected which is sufficiently mature and will produce an accurate indication of ultimate loss and hence overall profitability. The loss development patterns of the policies in the Consortium database are analyzed by examining traditional actuarial loss development triangles and associated loss development factors. An experienced actuary uses this information to determine the appropriate development period for a particular commercial major coverage. The actuary must strike a reasonable balance between the loss development maturity of the data and the resultant number of policies available for modeling. For a given set of policies in the Consortium database, as the required loss development period increases, the number of policies that can be employed correspondingly decreases.

For example, general liability coverage provides coverage for slip and fall claims. While a slip and fall claim may be properly and timely brought to attention during the policy's period of coverage, actual claim payouts may be deferred over several years as is the case when the liability for a slip and fall claim must first be adjudicated in a court of law. Actuarially accounting for such a claim event is critical to the development of the system and method of the present invention. Accurately matching an actuarially acceptable portion of the ultimate payout to the policy period's premium is fundamental to the prediction of individual policyholder profitability.

Other actuarial modifications may also be required for the loss data. For example, very large losses could be capped to a lower loss amount since very large losses can distort the profitability discovery process in the development of the predictive statistical model. Therefore, very large losses are often capped to a lower loss amount. The most obvious method to cap large losses is simply not to cap them at all, i.e., to represent them on an unlimited basis. Naturally, this gives the truest indication of an individual policy's current term profitability. However, such an approach is rarely employed due to the volatility in the data that may also mask underlying actual relationships. The use of unlimited losses tends to distort such underlying relationships. A particular policyholder record with a large loss will create noise in the data, or in other words, too strong a signal than is actually warranted, and hence hinder the development of the more general, and more important, profitability relationships and signals. As a result, the large losses are often capped at a particular amount or at a certain percentile of the underlying data. Frequently, this is determined and completed individually for each commercial major line of coverage. Transformations, such as the logarithmic function, are also used to minimize the distorting effects of unusual large losses. The result of these loss capping techniques is the creation of a more robust and effective data set.

These actuarial modifications to both the premium and loss data, produce actuarially sound data that can be employed in the development of the predictive statistical model. As previously set forth, the actuarially modified data has been collectively referred to as "work data" while the actuarially modified premium and loss data has been referred to as "premium work data" and "loss work data," respectively.

In related step 112, the loss ratio is calculated for each policyholder and for each policyholder's term in the Consortium database. As explained earlier, the loss ratio is defined as the numerical ratio of the loss work data divided by the premium work data.

The loss ratio is an expression of an individual policy's profitability, as it represents that portion of the premium committed to losses. A high loss ratio, perhaps greater than 0.70, is indicative of an unprofitable policy. Similarly, a loss ratio of less than 0.70 could be indicative of a profitable policy. A loss ratio of 0.70 is a typical profitability demarcation for major lines of commercial insurance coverage since insurance companies also have a significant portion of the premium income devoted to non-claim expenses.

In another aspect of the present invention, "frequency", a second important dimension of profitability, must also be calculated in this step. Frequency is calculated by dividing the policy term total claim count by the policy term premium work data. The definition of a claim count varies in the insurance industry. Some insurance companies count each reported claimant involved in a reported claim as individual claim counts while other companies only count the reported claim regardless of the number of claimants. Additionally, some insurance companies count all reported claims regardless of the amount of loss dollars paid while other companies only count reported claims with non-zero payments. The frequency calculation process for the Consortium database may remove the differences between multiple claim count methods reflected in the Consortium database. Although the loss ratio is the best measure of profitability, frequency is another important measure of commercial insurance profitability. Due to the long tail nature of some commercial insurance coverage losses, as described above in step 108, frequency is often employed as a measurement of, or a proxy for, profitability, as the loss ratio may not be sufficiently developed to provide an accurate measurement of profitability in and of itself.

The remainder of this invention description will rely upon loss ratio as the primary measurement of profitability. But, it should be correctly assumed that frequency measurements of profitability are also included in the development of the system and method according to the present invention and in the measurements of profitability subsequently described herein.

Thereafter, in step 116 the cumulative loss ratio is calculated for a defined group. The cumulative loss ratio is defined as the sum of the loss work data for a defined group divided by the sum of the premium work data for the defined group. Typical definable groups would be based on the major lines of coverage. To calculate the loss ratio for an individual line of coverage, all of the loss work data and premium work data for all policyholders covered by the line of coverage are subtotaled and the loss ratio is calculated for the entire line of coverage.

In step 120, a statistical analysis on all of the data in the Consortium database is performed. That is, for each external variable from each external data source, a statistical analysis is performed that investigates the relationship of that individual external variable and the cumulative loss ratio for a defined group. Well known statistical techniques are employed to determine the magnitude and reliability of an apparent statistical relationship between an external variable and the cumulative loss ratio.

In table 3.0, an illustrative example is provided of the statistical analysis that is performed on the data in the Consortium database. The specific variable in this example identifies whether manufacturing activity (an external variable obtainable from Dun & Bradstreet) takes place at the specific policyholder's worksite. The defined group in this example is the property major coverage. Each column and row has been labeled "A-K" and "1-4", respectively. A description of the attendant statistical analysis follows the table.

TABLE 3.0

| 1 | A | B Policy % | C Prem % | D Exp % | E Freq Rel. | F Freq Rel. | G L.R. Rel. | H L.R. Rel. | I Capped L.R. Rel. | J Sev Rel. | K Capped Sev Rel. |
|---|---|---|---|---|---|---|---|---|---|---|---|
| 2 | Not On Site | 22% | 21% | 19% | −6% | −5% | −14% | −11% | −13% | −9% | −8% |
| 3 | On Site | 44% | 49% | 51% | 2% | 3% | 1% | 5% | 3% | −3% | 0% |
| 4 | No Data | 34% | 31% | 30% | −2% | — | 8% | — | 5% | 7% | 5% |

The variable, "manufacturing-onsite", can take on three values, each listed in A2-A4. Column B indicates the percentage of policies in the Consortium database that take on each value of the variable manufacturing-onsite. Similarly, column C indicates the percentage of premium those policies represent in the Consortium database. Column D indicates the associated number of exposures for the same policies. It is possible that some policies could have more than one exposure, e.g., place of business, on the policy. Column E indicates the claim frequency on a manualized premium basis, again, for each value that the variable manufacturing-onsite can assume in the Consortium database for the property major coverage. Similarly, Column F has the same information but is based on a non-manualized premium, i.e., the actual written premium. Column G indicates the loss ratio relativity, based on a manualized premium. Similarly, Column H indicates the same for the actual written premium. Column I indicates the loss ratio relativity, of the manualized premium, but with the underlying large losses capped at an appropriate maximum. Column J indicates the severity relativity, or average loss size relativity. Similarly, Column K has the same information but with the underlying large losses capped at an appropriate maximum.

This variable so illustrated, manufacturing-onsite, does in fact suggest that there is some relationship between the variable and commercial insurance profitability. This can be inferred from the fact that both the loss ratio relativity, as well as several other indicators for profitability, are all relatively improved when policyholders do not have manufacturing activities at their site of business, and conversely as well.

Each value that an external variable can assume, has a loss ratio calculated from the underlying data which is then further segmented by a definable group (e.g., major line of coverage). For purposes of illustration, the external variable of business-location-ownership is used. Business-location-ownership is an external variable, or piece of information, available from Dun & Bradstreet. It defines whether the physical location of the insured business is owned by the business owner or rented by the business owner. Each individual variable can take on appropriate values. In the case of business-location-ownership, the values are O=owned and R=rented. (Naturally, in real world data bases, other values which would be invalid may also occur. Statistical and actuarial techniques are employed to address such errors.) The cumulative loss ratio is calculated for each of these values. For business owner location, the O value might have a cumulative loss ratio of 0.60, while the R value might have a cumulative loss ratio of 0.80. That is, based on the premium work data and loss work data, owners have a cumulative loss ratio of 0.60 while renters have a cumulative loss ratio of 0.80.

This analysis may then be further segmented by the major line of coverage. So, for business-owner-location, the losses and premiums are segmented by major line of coverage. The cumulative loss ratio for each of the values O and R are calculated by major line of coverage. This is possible since the Consortium database can differentiate premiums and losses by major line of coverage.

As an example, consider the variable major-line-of-coverage in the Consortium database. It can take on the values of 1-3, representing respectively, property, automobile, and workers compensation. Furthermore, consider the following expanded example shown below in table 4.0 that illustrates how business-owner-location can be analyzed by major line of coverage.

TABLE 4.0

| business-owner-location | (1) property | (2) automobile | (3) workers compensation | In Total |
|---|---|---|---|---|
| owned | 0.50 | 0.65 | 0.68 | 0.60 |
| rented | 0.90 | 0.75 | 0.72 | 0.80 |
| total | 0.70 | 0.70 | 0.70 | 0.70 |

In the example above, insights can be made to the potential value that the variable business-owner-location potentially may have in relation to commercial insurance profitability as expressed by the cumulative loss ratio. In this example, business-owner-location appears to have the most potential value and consideration for the property major coverage.

In step 124, a review is made of all of the outputs derived from previous step 120. This review is based, in part, on human experience and expertise in judging what individual external variables available from the external data sources should be considered in the creation of the statistical model that will be used to predict the future profitability of an individual policyholder.

In order to develop a robust system that will predict commercial insurance profitability on a per policyholder basis, it is important to include only those individual external variables that, in and of themselves, can contribute to the development of the model (hereinafter "predictor variables"). In other words, the individual external variables under critical determination in step 124 should have some relationship to profitability, i.e., loss ratio; and in the best judgment of the statisticians and actuaries, be reasonably casually related in the real world.

In the above mentioned example of business-location-ownership, it is somewhat clear from the cumulative loss ratios described above, i.e., the O value (0.60) and the R value (0.80), that business-location-ownership may in fact be related to profitability and therefore may in fact be considered a predictor variable.

As might be expected, the critical determination process of step 124 becomes much more complex as the number of values that an individual external variable might assume increases. Using the 40 year average hail fall occurrence as an example, this individual external variable can have values that range from 0 to the historical maximum, of say 30 annual events, with all of the numbers in-between as possible values. In order to complete the critical determination of such an individual external variable, it must be viewed in a particular manner conducive to such a critical determination, so that the highly experienced actuary and statistician can in fact make the appropriate critical determination of its efficacy for inclusion in the development of the predictive statistical model.

A common statistical method, called binning, is employed to arrange similar values together into a single grouping, called a bin. In the 40 year average hail fall individual data element example, ten bins might be produced, each containing 3 values, e.g., bin 1 equals values 0-3, bin 2 equals values 4-6, and so on. The binning process, so described, yields ten summary values for the 40 year average hail fall individual external variable. That is to say, that the original 40 year average hail fall values of 0-3 are now binned or grouped together into a single value, namely the bin "1" value. Hence, the original range of 30 values has been collapsed into 10 values, upon which the remaining analysis is completed. The critical determination of the 40 year average hail fall variable can then be completed by the experienced actuary and statistician by examining the 10 binned values, rather than the original 30 values.

The cumulative loss ratio of each bin must be considered in relation to the cumulative loss ratio of each other bin, and the overall pattern of cumulative loss ratios considered together. Several possible patterns might be discernable. If the cumulative loss ratio of the individual bins are arranged in a generally increasing or decreasing pattern, then it is clear to the experienced actuary and statistician that the bins, and hence the underlying individual data elements comprising them, could in fact be related to commercial insurance profitability, and therefore, should be considered for inclusion in the development of the statistical model.

Likewise, a saw toothed pattern, i.e., one where values of the cumulative loss ratio from bin to bin exhibit an erratic pattern, and do not display any general direction trend, would usually not offer any causal relationship to commercial insurance profitability, and hence, would not be considered for inclusion in the development of the predictive statistical model. Other patterns, some very complicated and subtle, can only be discerned by the trained and experienced eye of the actuary or statistician, specifically skilled in this work.

Thereafter in step 128, the predictor variables from the various external data sources that pass the review in prior step 124, are examined for cross correlations against one another. In this analysis, two different predictor variables, years-in-business and business-owners-age, are compared one to another. Since each of these predictor variables can assume a wide range of values, assume that each has been binned into five bins (as discussed above). Furthermore, assume that as the average value of years-in-business increases from bin to bin, so does the average value of business-owners-age increase as well, in a similar, proportional, and like manner.

This type of variable to variable comparison is referred to as a correlation analysis. In other words, how "co-related" are individual pairs of variables in relation to one another.

All individual variables are compared to all other individual variables in such a similar fashion. A master matrix is prepared that has the correlation coefficient for each pair of predictor variables. The correlation coefficient is a mathematical expression for the degree of correlation between any pair of predictor variables. Its value ranges from −1 to +1, with −1 being perfectly negatively correlation, +1 being perfectly positively correlation, and 0 being no correlation. Therefore, the greater the absolute value of the correlation coefficient, the greater the degree of correlation between the pair of individual variables.

The experienced and trained actuary or statistician will review the matrix of correlation coefficients. The review will seek to identify those pairs of predictor variables that are highly correlated with one another. Once identified, the real world meaning of each predictor variable is evaluated. In the example above, the real world meaning of years-in-business and business-owner-age may be well understood. One reasonable causal explanation why this specific pair of predictive external variables might be highly correlated with one another would be that the older the business owner, the longer the business owner has been in business.

So naturally, the goal of the correlation study is to eliminate highly repetitive variables. The experienced and trained actuary or statistician will compare each variable with every other variable, as well as examining the correlation coefficient for each pair. If the correlation is too high for a pair, one of the variables will be considered for removal, but not both. In general, variable pairs with a correlation coefficient of 0.6 are reviewed, while a variable pair with a correlation coefficient over 0.8 would warrant serious consideration for elimination of one of the variables. Again, the experienced and trained actuary or statistician would need to consider the real world meaning of any and all variables considered for elimination to ensure that the underlying correlation is casually related in the external world, and not just a causally statistically related.

The experienced actuary or statistician then would need to make a trained decision to potentially remove one of the two predictor variables, but not both. Such a decision would weigh the degree of correlation between the two predictor variables and the real world meaning of each of the two predictor variables.

As shown in FIG. 2A, in step 200, the portion of the Consortium database that passes through all of the above pertinent steps, is subdivided into three separate data subsets, namely, the training data set, the testing data set, and the validation data set. Different actuarial and statistical techniques can be employed to develop these three data sets from the Consortium database. They include a random splitting of the data and a time series split. The time series split might reserve the most recent few years of historical data for the validation data set, and the prior years for the training and testing data sets. Such a final determination is made within the expert judgment of the actuary and statistician. The three data sets are utilized as follows:

1. Training Data Set

The development process to construct the predictive statistical model requires a subset of the data to develop the mathematical components of the statistical model. This subset of data is referred to as the training data set.

2. Testing Data Set

At times, the process of developing these mathematical components can actually exceed the actual relationships embedded in the data, and overstate such relationships. As a result, the coefficients that describe the mathematical components can be subject to error. In order to monitor and minimize the overstating of the relationships, and hence the degree of error in the coefficients, a second data subset is subdivided from the Consortium data base, and is referred to as the testing data set.

3. Validation Data Set

The third subset of data, the validation data set, functions as a final determination of the degree of predictiveness of commercial insurance profitability that the mathematical components of the system can be reasonably expected to achieve on a go forward basis. Since the development of the coefficients of the predictive statistical model are influenced during the development process by the training and testing data sets, the validation data set provides an independent, non-biased estimate of the efficacy of the predictive statistical model.

The actual construction of the predictive statistical model involves sub-steps 204A and 204B, as shown in FIG. 2A. More particularly, in sub-step 204A, the training data set is used to produce an initial statistical model. There are numerous statistical methods that may be employed to produce the initial statistical model. These may include multivariate methods, e.g., multiple regression, generalized linear modeling, and the like, clustering algorithms, decision tree techniques, and any one of the different neural network algorithms. Such mathematical methods are available in a number of commercially available software products, e.g., SAS (Statistical Analysis System) in Cary, N.C., the Elementine product from SPSS in Chicago, Ill., and the like. The family of multivariate methods, which includes several neural network algorithms, is herein employed to describe the initial statistical model. The initial statistical modeling process itself further eliminates potential predictor variables. Standard statistical methods are employed to determine the optimum set of predictor variables that will provide for the most predictive model. The statistical power or predictiveness of an individual model is determined by both its degree of predictiveness and its stability of prediction over time, as evidenced by the model's efficacy on the validation data set. The initial statistical model results in a mathematical equation that produces coefficients for each of the individual selected predictor variables in the training data, that relate those individual variables to profitability, which is represented by the loss ratio of each individual policyholder's record in the training data base. The coefficients represent the contribution of each of the predictor variables to the overall prediction of the dependent variable, i.e., the commercial insurance profitability as represented by the loss ratio.

Several different statistical techniques are employed in substep A. Conventional multiple regression is the first technique employed. It produces an initial model. The second technique employed is generalized linear modeling. In some instances, this technique is capable of producing a more precise set of coefficients than the multiple regression technique. The final technique employed is a type of neural network, i.e. backwards propagation of errors, or "backprop" for short. Backprop is capable of even more precise coefficients than generalized linear modeling. Backprop can produce nonlinear curve fitting in multi-dimensions, and as such, can operate as a universal function approximator. Due to the power of this technique, the resulting coefficients can be quite precise, and as such, yield a strong set of relationships to profitability, i.e., loss ratio.

In sub-step 204B, the testing data set is used to evaluate if the coefficients from sub-step 204A have "overfit" the training data set. Naturally, no data set that represents real world data is perfect; every such real world data set has anomalies and noise in the data. That is to say, statistical relationships that are not representative of external world realities. Overfitting can result when the statistical technique employed results in coefficients that not only map the relationships between the individual variables in the training set to profitability, but also begin to map the relationships between the noise in the training data set and profitability. When this happens, the coefficients are too fine-tuned to the eccentricities of the training data set. The testing data set is used to determine the extent of such an overfitting. Since it is highly unlikely that the noise in the training data set will be identical to the noise in the testing data set, the testing data set can be used in such an evaluative manner.

The development process of the predictive statistical model generates the mathematical formula's coefficients. One example of the form of such a simplified equation might be as follows: $a_0 + a_1 x_1 + a_2 x_2 + \ldots a_n x_n = y$. In this example, the "a's" are the coefficients, the "x's" are the individual predictor variables, and "y" is the score, i.e., the indication of commercial insurance profitability. The "$a_0$" is the mathematical "y-intercept". For illustrative purposes, consider the following simple example shown below in table 5.0 where each variable listed below is multiplied times its corresponding coefficient:

TABLE 5.0

| Predictor Variables | Variable Value | ×Coefficient | =Result |
|---|---|---|---|
| Crime rate | 3 | 2 | 6 |
| Bankruptcy | 0 | 12 | 0 |
| Manufacturing | 1 | −3 | −3 |
| Sales | 24 | 1.5 | 36 |
| Unemployment rate | 4 | 2 | 8 |
| Hail fall | 1 | 10 | 10 |
| Education | 3 | 2 | 6 |
| $a_0$ = y-intercept | | | 2.5 |
| total sum | | | 65.5 |

In this example, the actual value of each predictor variable is multiplied times each predictor variable's coefficient value, and each of those multiplicative results are summed up together, including the $a_0$ (y-intercept), to produce the statistical model's score.

The development process of the predictive statistical model is iterative between sub-steps 204A and 204B. A set of coefficients is developed in sub-step 204A, and that process is halted. The set of coefficients is evaluated for predictiveness on the testing data set, i.e., in sub-step 204B. This halting and evaluation process is repeated until the predictiveness of the current set of coefficients on the testing data set begins to degrade. At that point, the coefficients from sub-step 204A have begun to describe the noise of the training data set that is not present in the testing data set, and the iterative process can be stopped. The coefficients that correspond to this final point in the mathematical development process represent the coefficients of the final system.

The final predictive statistical model employs the validation data set as a final independent determination of the degree of predictiveness of the system, as described in steps 208, 212, 216 and 220. Since the iterative nature described above results in the final coefficients being influenced by both the training and testing data sets, it is important to be able to ascertain the final efficacy of the coefficients on a separate independent, nonbiased data set, i.e., the validation data set.

In step 208, each record in the validation data set is scored by the predictive statistical model that was completed in sub-steps 204A and 204B. The score is attached to each record in the validation data set. The validation data set is then sorted by the score, from lowest to highest score. The low scores are associated with low values of predicted profitability or loss ratio, and vice versa. Therefore, the lower score ranges should be indicative of more profitability, and vice versa.

Typically, in step 212 the sorted validation sample is divided into ten regions of equal size, i.e., deciles, but other sizes are sometimes employed. Thereafter, in step 216, the cumulative loss ratio of each decile for the validation data set is then calculated from the work data completed in step 108.

As shown in FIG. 2B, the loss ratio relativity of each decile is then calculated in step 220. The loss ratio relativity of each decile is defined as the cumulative loss ratio of the decile minus the cumulative loss ratio of the entire validation data set and that result is then divided by the cumulative loss ratio of the entire validation data set. For example, if the overall loss ratio of the validation data set is 0.80, i.e., 80 cents of every premium dollar was used to pay claims, and if the cumulative loss ratio of decile 1 is 0.60, then decile 1's loss ratio relativity is −25%=(0.60−0.80)/0.80.

In step 224, the final step, the predictive statistical model is used to score new or existing policyholders in order to predict the future profitability of commercial insurance for each new or existing policyholder. The go forward scoring of new or existing policyholders is accomplished as follows. The external data used by the statistical model (i.e., the predictor variables) are accessed from the particular external data source. This data is electronically sent to the system of the present invention. These may include external data such as Dun & Bradstreet, zip code census, and the like as previously detailed. The values of these individual variables, employed by the system, once secured are then inserted into the mathematical formula that comprises the statistical model developed in sub-steps 204A and 204B. The coefficients are typically multiplied times the values of the individual variables, and other required formula calculations are also completed. In this manner, a score is produced by the system for a new or existing policyholder record.

Then, the pertinent decile from step 212 that this particular policyholder record score falls into, is determined. This is accomplished by examining the lowest and highest validation data set score for each decile, and determining which decile the new policyholder record score falls into. The loss ratio relativity of that corresponding decile, or other similarly developed score range sized grouping, represents the system's commercial insurance profitability prediction.

The magnitude of the loss ratio relativity associated with the appropriate decile, indicates the size or amount of the commercial insurance profitability prediction. The sign, either positive or negative, of the loss ratio relativity associated with the appropriate decile, indicates whether the predicted commercial insurance profitability is either positive or negative. If the sign is negative, then the policyholder record has a profitability indication. That is to say, a negative loss ratio relativity equates to a loss ratio that is relatively less than the overall average, and hence, more profitable. If the sign is positive, then the policyholder record has an unprofitability indication, in a similar fashion. The associated magnitude of the corresponding decile's loss ratio relativity indicates how much in each case, as noted above.

With the commercial insurance profitability system completed, there are a variety of different options that different purchasers (e.g., insurance carriers) might choose to have access to the score producing, predictive statistical model.

One purchaser might require a system including the predictive statistical model to be installed on its computer systems. In this case, the system, which has been encoded into software, would be loaded on a custom installation basis, into the purchaser's computer environment. The appropriate network programs would be constructed to enable the automatic querying of the requisite external data (e.g., Dun & Bradstreet) to interface with the system.

Alternatively, a purchaser might transmit single policies, or a batch of many policies, to be scored off-line and off-site by a third party who was offering such a commercial insurance profitability scoring capability using the predictive statistical model as described.

Another purchaser might be desirous of internet based access. This would be a variation of the immediately preceding description. Such a purchaser would connect on-line to the Internet, in a known manner, and enter in the name and address of the business requiring a commercial insurance profitability score from the system. The system would be web-enabled and would be capable of scoring such queries and returning the appropriate score.

In accordance with the present invention, a commercial insurance scoring system and method are provided which predict individual commercial insurance policyholder profitability on a prospective basis regardless of the internal data and business practices of a particular insurance company.

\* \* \*

In so far as embodiments of the invention described herein may be implemented, at least in part, using software controlled programmable processing devices, such as a computer system, it will be appreciated that one or more computer programs for configuring such programmable devices or system of devices to implement the foregoing described methods are to be considered an aspect of the present invention. The computer programs may be embodied as source code and undergo compilation for implementation on processing devices or a system of devices, or may be embodied as object code, for example. Those of ordinary skill will readily understand that the term computer in its most general sense encompasses programmable devices such as those referred to above, and data processing apparatus, computer systems and the like.

Preferably, the computer programs are stored on carrier media in machine or device readable form, for example in solid-state memory or magnetic memory such as disk or tape, and processing devices utilize the programs or parts thereof to configure themselves for operation. The computer programs may be supplied from remote sources embodied in communications media, such as electronic signals, radio frequency carrier waves, optical carrier waves and the like. Such carrier media are also contemplated as aspects of the present invention.

It will thus be seen that the objects set forth above, among those made apparent from the preceding description, are efficiently attained and, since certain changes may be made in carrying out the above method and in the system set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A method for predicting the profitability of a commercial insurance policy, said method comprising:

obtaining policyholder data including premium and loss data from a database;

obtaining external data directed to at least one of business level data and household demographics data, the external data having a plurality of external variables to be used in predicting the profitability of the insurance policy;

associating the external variables with the policyholder data;

creating by a computer one or more derived variables derived from at least one of said external variables and said policyholder data;
evaluating by the computer, the associated external variables and at least one of the derived variables against the policyholder data;
identifying a set of variables predictive of the insurance policy's profitability based on the evaluation of the associated external variables and at least one of the derived variables against the policyholder data; and
creating a score based on an individually weighted multivariate statistical model based on said set of predictive variables, wherein said score is expressed as a sum of products, each of said products being a coefficient multiplied by a variable taken to a power, said coefficients generated mathematically by operating on said set of predictive variables, and wherein said score is a function of said set of predictive variables.

2. The method of claim 1 further comprising creating individual records in the database for each policyholder and populating each individual record with premium and loss data, business name, address and zip code for each policyholder and the associated external variables.

3. The method of claim 2 further comprising associating at least one individual external variable with the individual records based on a unique data key associated with at least one external data source.

4. The method of claim 1 further comprising normalizing the policyholder data in the database.

5. The method of claim 4 wherein said normalizing further comprises premium manualization, loss trending and loss capping.

6. The method of claim 3 wherein the at least one external data source includes external variables for at least one of geographic factors, business stability and weather patterns.

7. The method of claim 1 wherein said evaluating the external variables further comprises examining the external variables for cross-correlation against one another in order to eliminate repetitive external variables.

8. The method of claim 1 further comprising dividing the data in the database into a training data set for developing the statistical model, a testing data set for refining the statistical model and a validation data set for evaluating the predictiveness of the statistical model.

9. The method of claim 1 wherein said identifying the external variables predictive of an insurance policy's profitability further includes normalizing the policyholder data, calculating for each policyholder the loss ratio based on the normalized policyholder data, defining a subgroup from the policyholder data, calculating a cumulative loss ratio for the subgroup and performing a statistical analysis to identify statistical relationships between individual external variables and the cumulative loss ratio for the subgroup.

10. The method of claim 9 wherein the identified predictive external variables are examined for cross-correlations against one another.

11. The method of claim 9 wherein the statistical model is created using multivariate methods to produce coefficients for each of the external predictive variables and the coefficients represent the contribution of the each of the external predictive variables to an overall score.

12. A program storage device readable by a machine, said program storage device tangibly embodying a program of instructions executable by the machine to perform a method comprising:
gathering historical policyholder data, including loss and premium data; identifying external data sources having a plurality of external variables, each external variable having a value assigned by applying an actuarial transformation to the policyholder data to generate working data;
creating one or more derived variables derived from at least one of the external variables and the policyholder data;
calculating a loss ratio for each policyholder in the database based on the working data;
calculating a cumulative loss ratio for a defined group of policyholders in the database;
performing a statistical analysis on each external variable and each derived variable;
determining the relationship of each external variable, each derived variable and the cumulative loss ratio for the defined group based on the statistical analysis performed;
identifying a set of variables that are predictive of the profitability of the insurance policy based on performing the statistical analysis on each external variable and each derived variable; and
utilizing the set of predictive variables to develop an individually weighted multivariate statistical model that generates a score predictive of the profitability of the insurance policy,
wherein said score is expressed as a sum of products, each of said products being a coefficient multiplied by a variable taken to a power, said coefficients generated mathematically by operating on said set of predictive variables and wherein said score is a function of said set of predictive variables.

13. The program storage device of claim 12 wherein the statistical model is used to score at least one of an existing policyholder and a new policyholder in order to determine the premium for a commercial insurance policy.

14. The program storage device of claim 12 further comprising manualizing the premium data, actuarially modifying long tail losses and capping large losses.

15. The program storage device of claim 12 further comprising binning together similar values of an external variable having multiple values.

16. The program storage device of claim 12 further comprising examining the external variables for cross-correlation against one another in order to eliminate repetitive external variables.

17. The program storage device of claim 12 further comprising dividing the data in the database into a training data set for developing the statistical model, a testing data set for refining the statistical model and a validation data set for evaluating the predictiveness of the statistical model.

18. The program storage device of claim 12 wherein the statistical model is created using multivariate methods to produce coefficients for each of the external predictive variables and wherein said coefficients represent the contribution of the each of the external predictive variables to the score.

19. A program storage device readable by a machine, said program storage device tangibly embodying a program of instructions executable by the machine to perform a method of performing risk-based pricing of an insurance policy, comprising:
receiving a request for a price on an insurance policy; and
evaluating the risk associated with issuing the insurance policy based on a profitability score derived from an individually weighted multivariate statistical model comprising a set of predictive variables, said set of predictive variables generated from (i) historical policyholder premium and loss data, (ii) variables identified from external data sources, and (iii) synthetic variables derived from said external variables identified from external data sources and said policyholder premium and loss data, said external data sources being independent of internal policyholder data of an insurance company issuing the insurance policy,
wherein said score is expressed as a sum of products, each of said products being a coefficient multiplied by a variable taken to a power, wherein said coefficients are generated mathematically by operating on said set of predictive variables, and wherein said score is a function of said set of predictive variables.

20. The program storage device of claim 19 wherein the external data sources include external variables for at least one of geographic factors, business stability and weather patterns.

21. The program storage device of claim 19 wherein the external data sources include at least one of business level data and household demographics data.

22. The program storage device of claim 19 further comprising examining the external predictive variables for cross-correlation against one another in order to eliminate repetitive external variables.

23. The program storage device of claim 19 wherein said identifying the external predictive variables further includes normalizing the policyholder data, calculating for each policyholder the loss ratio based on the normalized policyholder data, defining a subgroup from the policyholder data, calculating a cumulative loss ratio for the subgroup and performing a statistical analysis to identify statistical relationships between individual external predictive variables and the cumulative loss ratio for the subgroup.

24. The program storage device of claim 22 wherein the identified external predictive variables are examined for cross-correlations against one another.

25. The program storage device of claim 19 wherein the statistical model is created using multivariate methods to produce coefficients for each of the external predictive variables and the coefficients represent the contribution of the each of the external predictive variables to an overall score.

26. The program storage device of claim 19 further comprising the step of dividing the policyholder data into a training data set for developing the statistical model, a testing data set for refining the statistical model and a validation data set for evaluating the predictiveness of the statistical model.

* * * * *